United States Patent
Martinello

(10) Patent No.: US 11,475,640 B2
(45) Date of Patent: Oct. 18, 2022

(54) DETECTION-AREA FENCING WITH POLARITY AND OBJECT INGRESS/EGRESS MONITORING

(71) Applicant: Manuel Martinello, Mountain View, CA (US)

(72) Inventor: Manuel Martinello, Mountain View, CA (US)

( * ) Notice: Subject to any disclaimer, the term of this patent is extended or adjusted under 35 U.S.C. 154(b) by 0 days.

(21) Appl. No.: 16/872,123

(22) Filed: May 11, 2020

(65) Prior Publication Data

US 2021/0272364 A1 Sep. 2, 2021

Related U.S. Application Data

(63) Continuation-in-part of application No. 16/804,639, filed on Feb. 28, 2020.

(51) Int. Cl.
| | | |
|---|---|---|
| G06T 19/00 | (2011.01) | |
| G06F 3/01 | (2006.01) | |
| G06T 7/00 | (2017.01) | |
| G06T 11/20 | (2006.01) | |
| G06V 20/40 | (2022.01) | |
| G06V 20/52 | (2022.01) | |

(Continued)

(52) U.S. Cl.
CPC ............ *G06T 19/006* (2013.01); *G06F 3/011* (2013.01); *G06T 7/00* (2013.01); *G06T 11/203* (2013.01); *G06V 20/46* (2022.01); *G06T 2207/30232* (2013.01)

(58) Field of Classification Search
USPC .................................. 386/223–230, 239–248
See application file for complete search history.

(56) References Cited

U.S. PATENT DOCUMENTS

| | | |
|---|---|---|
| 11,195,002 B2 | 12/2021 | Roberts et al. |
| 11,244,466 B2 | 2/2022 | Dinh et al. |
| 2010/0262297 A1 | 10/2010 | Shloush et al. |

(Continued)

FOREIGN PATENT DOCUMENTS

| | | |
|---|---|---|
| JP | 2008281241 A | 11/2008 |
| JP | 2013040693 A | 2/2013 |

(Continued)

OTHER PUBLICATIONS

Japanese Office Action for Application No. 2021-028953, dated Feb. 22, 2022, with English translation, 16 pgs.

*Primary Examiner* — Hung Q Dang
(74) *Attorney, Agent, or Firm* — Patent Law Works LLP

(57) ABSTRACT

Image data describing a physical space is received from one or more sensor(s). A corresponding image of the physical space is output to a user. User generated control signals are received, indicating to define one or more line(s) at specific coordinates in relation to the physical space. One or more line(s) are defined in response to the received control signals. Polarity is assigned to the line(s), wherein crossing a line in a first direction is defined as an ingress and crossing a line in a second, opposite direction is defined as an egress. An image of the line(s) is superimposed on the image of the physical space, wherein the image of the line(s) graphically indicates the assigned polarity. Physical objects are monitored in relation to the one or more line(s) in the physical space. An action is automatically taken in response to activity detected by the monitoring.

20 Claims, 5 Drawing Sheets

(51) Int. Cl.
  *G07C 9/27* (2020.01)
  *G07C 9/28* (2020.01)

(56) References Cited

U.S. PATENT DOCUMENTS

| | | | |
|---|---|---|---|
| 2012/0062732 A1* | 3/2012 | Marman | G08B 13/19682 |
| | | | 348/142 |
| 2012/0086780 A1* | 4/2012 | Sharma | G06K 9/00771 |
| | | | 348/46 |
| 2015/0156031 A1 | 6/2015 | Fadell et al. | |
| 2015/0163626 A1* | 6/2015 | Zimmer | H04W 4/02 |
| | | | 455/404.2 |
| 2016/0351031 A1* | 12/2016 | Jo | G08B 13/19684 |
| 2017/0026787 A1* | 1/2017 | Chow | G01S 5/0242 |
| 2017/0039728 A1* | 2/2017 | Bamba | G08B 13/19602 |
| 2017/0169560 A1* | 6/2017 | Johansson | G08B 13/196 |
| 2017/0293807 A1 | 10/2017 | Mizes et al. | |
| 2018/0082140 A1* | 3/2018 | Ida | G06F 3/0488 |
| 2018/0181815 A1* | 6/2018 | Kanda | G06K 9/46 |
| 2018/0276829 A1* | 9/2018 | Chang | G06T 7/20 |
| 2019/0316801 A1 | 10/2019 | Dorna et al. | |

FOREIGN PATENT DOCUMENTS

| | | |
|---|---|---|
| JP | 2015178915 A | 10/2015 |
| KR | 101875488 B1 | 7/2018 |

* cited by examiner

DETECTION-AREA FENCING WITH POLARITY AND OBJECT INGRESS/EGRESS MONITORING

PRIORITY CLAIM

This application claims priority under 37 CFR § 1.78 as a Continuation-in-Part of pending patent application U.S. Ser. No. 16/804,639 titled "Tracking Conditions Concerning an Area to Automatically Generate Artificial Intelligence Based Responsive Actions" (the "Tracking Conditions Application"). The Tracking Conditions Application was filed on Feb. 28, 2020, and has the same Assignee as this application. The Tracking Conditions Application is incorporated herein by reference in its entirety.

TECHNICAL FIELD

This application generally relates to monitoring and tracking conditions in relation to a physical space, and more specifically to creating detection-area fences with polarity for object monitoring, including monitoring ingresses and egresses of objects.

SUMMARY

The techniques introduced herein provide a method and system for receiving image data describing a physical space from one or more sensor(s), outputting a corresponding image of the physical space to a user, receiving user generated control signals indicating to define one or more line(s) at specific coordinates in relation to the physical space, defining the one or more line(s) in response to the received user generated control signals, assigning a polarity to the one or more line(s), wherein crossing a line in a first direction is defined as an ingress and crossing a line in a second, opposite direction is defined as an egress, outputting an image of the one or more line(s) superimposed on the image of the physical space, wherein the image of the one or more line(s) graphically indicates the assigned polarity, monitoring physical objects in relation to the one or more line(s) in the physical space, and automatically taking one or more action(s) in response to activity detected by the monitoring.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
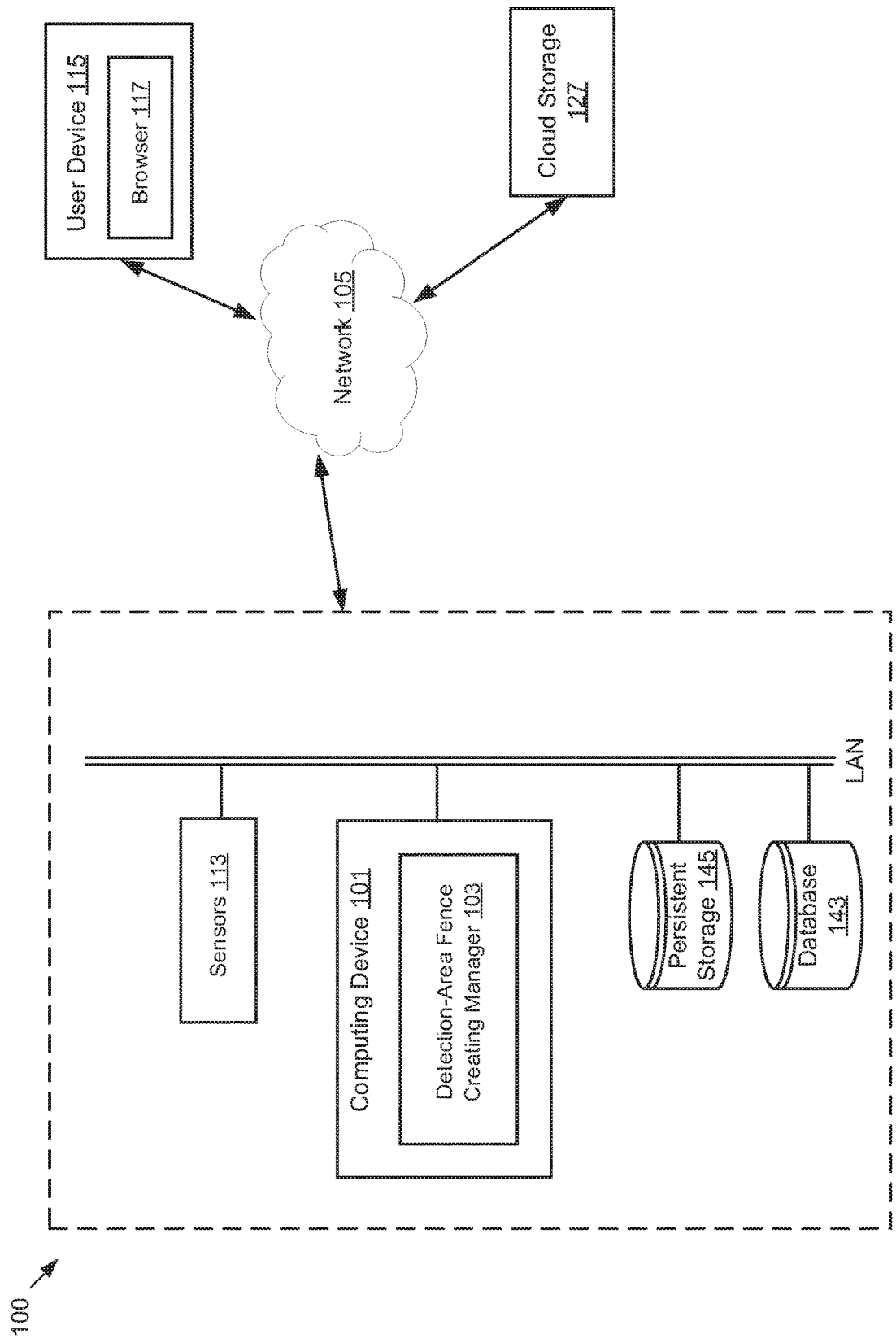
FIG. 1 depicts a high-level block diagram illustrating one implementation of a system for creating detection-area fences with polarity for object monitoring.

Described herein is a method and system for creating detection-area fences with polarity for object monitoring. More specifically, image data describing a physical space is received from one or more sensors, such as an image sensor, an ambient light sensor, an infrared sensor, a depth sensor, a thermal camera, a motion sensor, a proximity sensor, a video camera, a positioning sensor, etc. The physical space can be, for example, a building, a room, a portion of a building or a room, an office, a specific area of floor space, an area containing or proximate to specific machinery or equipment, a storage area, etc. The corresponding image of physical space is output to a user, e.g., via a display screen. User generated control signals are received, indicating to define one or more lines at specific coordinates in relation to the physical space. For example, the user can operate a provided graphical user interface (GUI) to draw the line(s) at specific locations on the image of the physical space. As the user interacts with components of the GUI (e.g., clicking a mouse with the cursor at specific locations, dragging the cursor, activating selected buttons or other GUI components, etc.), corresponding control signals are generated and received. A single line can be defined in response to the received user generated control signals, or multiple lines can be so defined, including multiple connected lines forming a polygon. A polarity is assigned to the line(s), such that crossing a line in one direction is defined as an ingress, and crossing the line in the opposite direction is defined as an egress. For a polygon, the assigned polarity distinguishes between the inside and outside of the polygon. For example, the polarity of the polygon can define the inside of the polygon as the ingress side and the outside as the egress side, or vice versa. An image of the line(s) and/or polygon(s) is superimposed on the image of the physical space and displayed, with graphical indicia showing the polarity. The assigned polarity can be reversed, for example in response to the user selecting a corresponding GUI component, indicating to reverse the polarity.

As described in detail in the "Tracking Conditions Application," it can be desirable to automatically monitor a physical space for various reasons, for example to detect ingresses and egresses and maintain an occupancy count. The line(s) and/or polygon(s) created as described herein can function as "fences" defining one or more "detection-area(s)," meaning that instead of monitoring the entire physical space, physical objects may be monitored in the physical space in relation to the polarized line(s). For example, a single line can be monitored for ingresses and egresses, or monitoring in relation to a polygon can be limited to the area inside (or outside) thereof, while the area outside of the "detection-area" can be ignored. Theses "fences" with polarity thus enable targeted monitoring. Because monitoring is computationally expensive, this targeted monitoring is desirable. Furthermore, the polarity of the lines and polygons enables a directional analysis of physical objects in relation to detection-areas in the physical space.

One or more corresponding actions can be automatically taken in response to activity that is detected by the monitoring. Examples of actions that may be taken in response to this detection include automatically adjusting a climate control system that controls temperature of the detection-area, adjusting a lighting system that controls illumination of the detection-area, automatically activating or deactivating a security system, turning a given piece of equipment on or off, limiting ingress or egress to/from the detection-area, and outputting an electronic directive to a specific party (e.g., an administrator or manager).

FIG. 1 depicts a high-level block diagram illustrating one implementation of a system 100 for creating detection-area fences with polarity within a physical space. The illustrated system 100 includes a computing device 101, sensors 113, a database 143, and a persistent storage 145. In the illustrated implementation, the computing device 101, sensors 113, database 143, and persistent storage 145 may be connected in a local area network (LAN) and are further communicatively coupled to other entities of the system 100 via a network 105. In other implementations, the database 143 and/or the persistent storage 145 may be located remotely and coupled to other entities of the system 100 via the network 105. The system 100 may further include a user device 115 and cloud storage 127. The components of the system 100 are described in more detail below.

Although specific numbers of some components are shown in FIG. 1, it should be understood that there may be more or fewer of such components in different implementations. Also, such entities can be connected by any number of networks and/or LANs. Other components (not illustrated) may be connected in a similar manner. Conversely, all of the components illustrated in FIG. 1 need not be present. The components can be interconnected in different ways from that shown in FIG. 1.

The sensors 113 may be hardware devices that detect and respond to input from a physical environment. The sensors 113 may be coupled to the LAN and/or the network 105 to provide information or signals about the physical environment. One or more sensors 113, including for example a series of sensors, or a grid or array of sensors, may be located in different LANs and coupled to the network 105. The sensors 113 can be in the form of, for example, sensors capable of detecting the ingress/egress of lines with polarity (e.g., directional fences), such as a motion sensor, a proximity sensor, a depth sensor, a video camera, a positioning sensor using, e.g., GPS, cellular, near field communications, video location, and other positioning techniques, etc. Other types of sensors may include, but are not limited to, an accelerometer, an ambient light sensor, a thermal sensor, an infrared sensor, a biometric sensor, a radio frequency detector, etc.

The computing device 101 may be in the form of a hardware or virtual device/server that performs the creation of detection-area fences with polarity within a physical space described herein. The computing device 101 may include a detection-area fence creating manager 103 as illustrated in FIG. 1. In some implementations, the detection-area fence creating manager 103 is implemented using programmable or specialized hardware. In some implementations, the detection-area fence creating manager 103 is implemented using a combination of hardware and software. In other implementations, the detection-area fence creating manager 103 is instantiated as software stored and executed on the computing device 101.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 may include Bluetooth communication networks or a cellular communications network for sending and receiving data including short messaging service (SMS), multimedia messaging service (MMS), hypertext transfer protocol (HTTP), direct data connection, WAP, email, etc.

The user device 115 may be in the form of a computing device including a processor, a memory, applications, storage, network communication capabilities, etc. For example, the user device 115 can be a laptop computer, a desktop computer, a tablet computer, a smart phone, a wearable computing device, a personal digital assistant (PDA), a mobile email device, a television with one or more processors embedded therein or coupled thereto or any other form electronic device capable of running applications, accessing the network 105 and communicating with other components of system 100. In some implementations, the user device 115 includes a browser 117. The browser 117 is an application running on the user device 115 that locates, retrieves, and displays content for a user accessing the user device 115. In some implementations, the detection-area fence creating manager 103 automatically outputs electronic directives to a specific party operating the user device, e.g., via the browser.

Figure 2:
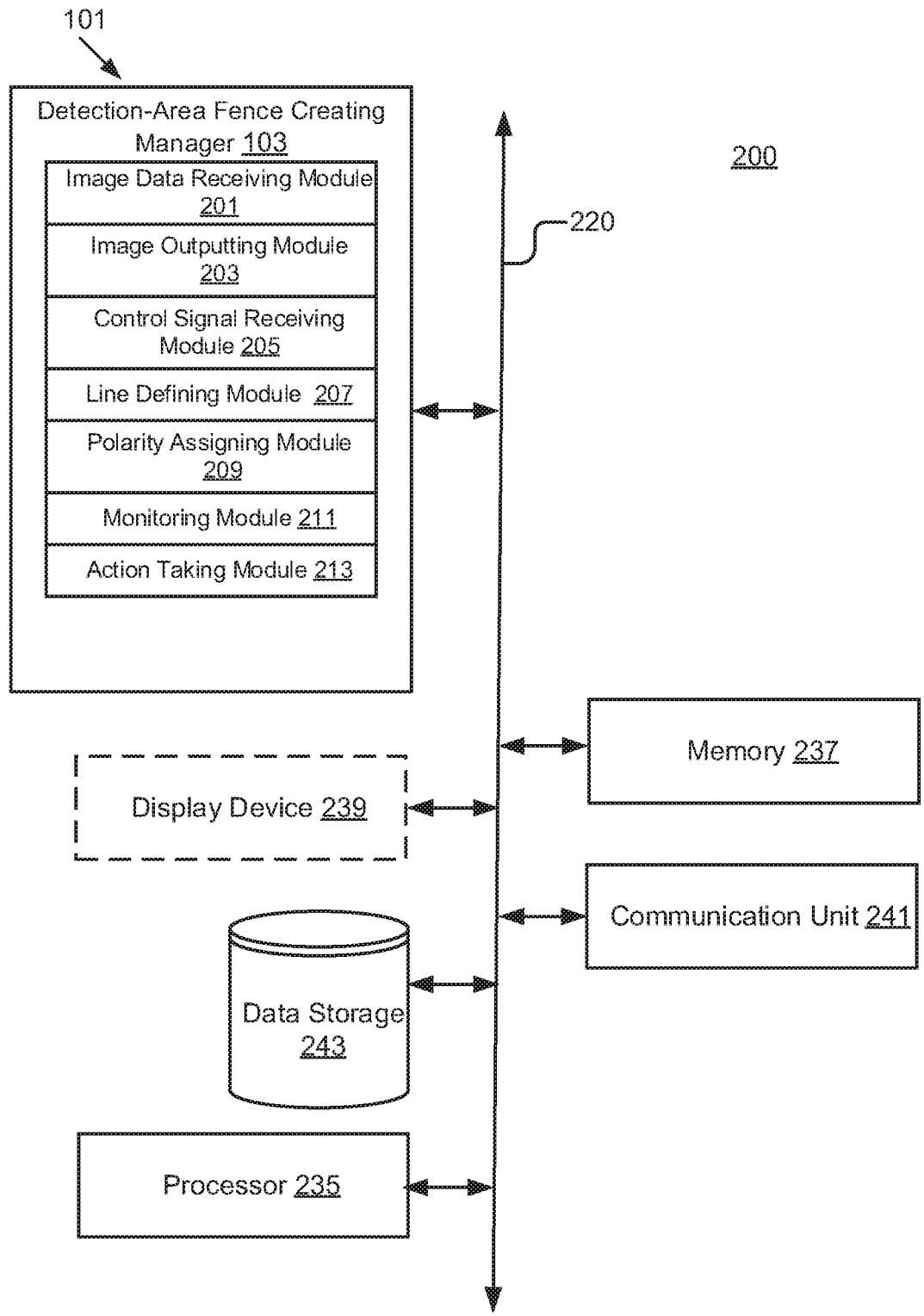
FIG. 2 depicts a block diagram illustrating one implementation of a computing device including an operating detection-area fence creating manager according to one implementation of the techniques described herein.

FIG. 2 depicts a block diagram illustrating one implementation of a computing device 101 including a detection-area fence creating manager 103. In some implementations, the computing device 101 is implemented as a system 200 which may also include a processor 235, a memory 237, an optional display device 239, a communication unit 241, and data storage 243 according to some examples. The components of the system 200 are communicatively coupled to a bus 220 for communication with each other.

The processor 235 may execute software instructions by performing various input/output, logical, and/or mathematical operations. The processor 235 may have various computing architectures to process data signals. The processor 235 may be physical and/or virtual and may include a single processing unit or a plurality of processing units and/or cores. In some implementations; the processor 235 may be capable of generating and providing electronic display signals to a display device, supporting the display of user interfaces used in receiving a user request for video content, identifying and providing the requested video content to a user, etc. In some implementations, the processor 235 may be coupled to the memory 3 via the bus 220 to access data and instructions therefrom and store data therein. The bus 220 may couple the processor 235 to the other components of the system 200 including, for example, the memory 237, the communication unit 241, the detection-area fence creating manager 103, and the data storage 243. It will be apparent to one skilled in the art that other processors, operating systems, and physical configurations are possible.

The memory 237 may store and provide access to data for the other components of the system 200. In some implementations, the memory 237 may store instructions and/or data that may be executed by the processor 235. The instructions and/or data may include code for performing the techniques described herein. For example, in one implementation, the memory 237 may store the detection-area fence creating manager 103. The memory 237 is also capable of storing other instructions and data, including, for example, an operating system, hardware drivers, other software applications, databases, etc. The memory 237 may be coupled to the bus 220 for communication with the processor 235 and the other components of the system 200.

The memory 237 may include one or more non-transitory computer-usable (e.g., readable, writeable) devices, a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray™, etc.), and/or other types of media, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The display device 239 may be a liquid crystal display (LCD), light emitting diode (LED) or any other similarly equipped display device, screen or monitor. The display device 239 represents any device equipped to display user interfaces, electronic images and data as described herein. In different implementations, the display is binary (only two different values for pixels), monochrome (multiple shades of one color), or allows multiple colors and shades. The display device 239 is coupled to the bus 220 for communication with the processor 235 and the other components of the system 200. It should be noted that the display device 239 is shown in FIG. 2 with dashed lines to indicate it is optional. For example, the system 200 may be a server without a display device 239.

The communication unit 241 is hardware for receiving and transmitting data by linking the processor 235 to the network 105 and other processing systems. In one implementation, the communication unit 241 may include a port for direct physical connection to the network 105. In another implementation, the communication unit 241 may include a wireless transceiver (not shown) for exchanging data via network 105 using one or more wireless communication methods, such as IEEE 802.11, IEEE 802.16, Bluetooth®, cellular communications, or another suitable wireless communication method.

The data storage 243 is a non-transitory memory that stores data for providing the functionality described herein. In the illustrated implementation, the data storage 243 is communicatively coupled to the bus 220 to receive data for storage and provide data for retrieval upon a request for the data.

The components of the detection-area fence creating manager 103 may include software and/or logic to provide the functionality they perform. In some implementations, the components can be implemented using programmable or specialized hardware including a field-programmable gate array (FPGA) or an application-specific integrated circuit (ASIC). In some implementations, the components can be implemented using a combination of hardware and software executable by the processor 235. In some implementations, the components are instructions executable by the processor 235. In some implementations, the components are stored in the memory 237 and are accessible and executable by the processor 235.

The image receiving module 201 of the detection-area fence creating manager 101 receives image data describing a physical space from one or more sensors 113. The physical space may be, for example, a building, a room, a portion of a building, a portion of a room, an office, a specific area of floor space, an area containing or proximate to specific machinery or equipment, a storage area, etc. The sensor(s) 113 may be positioned in or proximate to the physical space, and provide image data via network or other electronic communication. Examples of the types of sensors 113 that can be utilized in this context are an image sensor, an ambient light sensor, an infrared sensor, a depth sensor, a thermal camera, a motion sensor, a proximity sensor, a video camera and a positioning sensor. Other types of sensors 113 may be used in various implementations as desired.

The image outputting module 203 of the detection-area fence creating manager 101 outputs a corresponding image of the physical space to a user, for example by displaying the image on a display device 239 such as a screen. The user is thus able to view an image of the physical space, based on the image data provided by the sensors 113. The image of the physical space may be output to the user via a graphical user interface (GUI). In conjunction with the GUI, drawing program functionality may be provided that enables the user to draw or otherwise position images of lines and/or polygons at specific locations on the image of the physical space. For example, the user may interact with components of the GUI, such as clicking a pointing device at specific locations on the image to establish points of a line, dragging the cursor across the image to draw lines, activating selected buttons or other GUI components, etc.

More specifically, as the user operates the GUI, control signals corresponding to the users actions are generated and received by the control signal receiving module 205 of the detection-area fence creating manager 101. It is to be understood that in different implementations, various drawing program tools and functionalities can be provided to the user as desired, such as snap to grid, different options for widths, colors and other properties of lines, variable contrasts relative to the background, etc. In one example implementation, the user may operate a user device 115 that communicates with the detection-area fence creating manager 101 over a network 105, as shown in FIG. 1.

The line defining module 207 of the detection-area fence creating manager 101 defines at least one line in response to the received user generated control signals. As described in detail below, this can take the form of defining a single line or multiple lines, including connected lines forming a polygon, responsive to the what the user drew on the image of the physical space, as provided to the detection-area fence creating manager 101 in the form of control signals. It is to be further understood that although the user creates images of lines on the image of the physical space as displayed on the screen, the control signals generated by the user activity can be used by the line defining module 207 to define lines at specific coordinates in relation to the underlying physical space, as opposed to the image thereof, as described in detail below.

The polarity assigning module 209 of the detection-area fence creating manager 101 assigns a polarity to defined lines, such that crossing a polarized line in a first direction is defined as an ingress, and crossing the polarized line in a second, opposite direction is defined as an egress. Polarity of individual lines and polygons is described in detail below.

The image outputting module 203 outputs an image of the defined line(s) superimposed on the image of the physical space, wherein the image graphically indicates the assigned polarity. The different types of graphical indicia that may be used to indicate the polarity are described in detail below, in conjunction with the detailed descriptions of defining individual lines and polygons.

It is to be understood that polarity of lines and polygons may be reversed. For example, the image outputting module 203 may display a GUI object (e.g., a labeled button), activation of which by the user (e.g., clicking on the button with a mouse) generates a corresponding control signal, which is interpreted by the polarity assigning module 209 to reverse the polarity of the given (e.g., user selected) line or polygon. Once the polarity assigning module 209 reverses the polarity in response to the received control signal, the image outputting module 203 outputs an updated image of the line(s) superimposed on the image of the physical space, graphically indicating the current (i.e., reversed) polarity.

Figure 3:
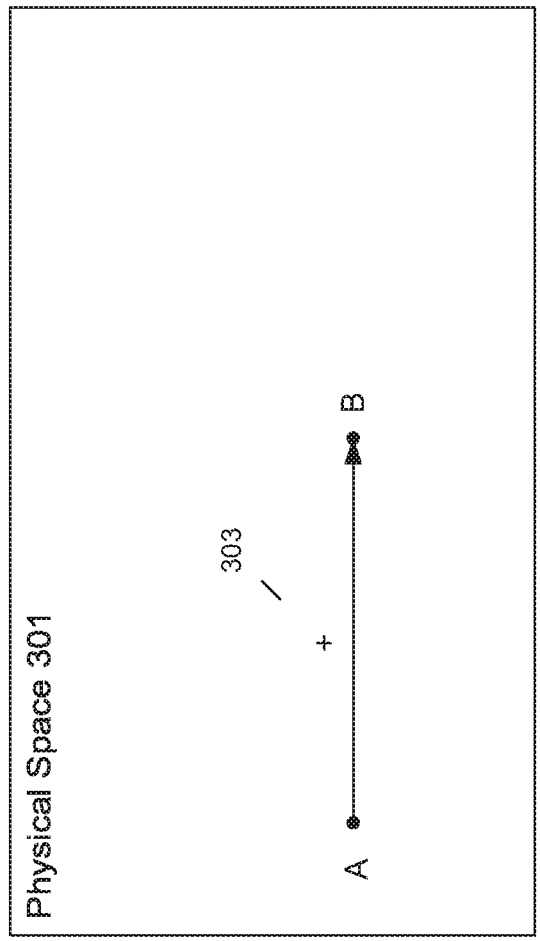
FIG. 3 depicts an image of a line displayed with assigned polarity, created according the operation of a detection-area fence creating manager according to one implementation of the techniques described herein.

An example of the line defining module 207 defining a single line between a first point and a second point is now described in more detail in conjunction with FIG. 3. Turning to FIG. 3, two points are illustrated, point A and point B. These points may be defined responsive to user generated control signals, resulting from the user first clicking at point A, and subsequently clicking at point B on the image of the physical space 301. In response, the line defining module 207 may define the single line AB, between the first point A and the second point B. In other implementations, lines may be defined in response to user generated control signals in other ways, for example in response to control signals indicating that the user has dragged a cursor between two points on the image of the physical space 301, specified two points by entering vector coordinates, etc.

The polarity assigning module 209 may assign the polarity to line AB relative to the order in which the points are defined. Assigning polarity to a single line may comprise defining an ingress side of the line and an egress side of the line. As illustrated in FIG. 3, once the line is defined and the polarity assigned, the image outputting module 203 outputs an image of the line superimposed on the image of the physical space 301, wherein a graphical indication 303 of the polarity of the line is displayed. In the example shown in FIG. 3, the graphical indication 303 is in the form of a plus sign indicating the ingress side of the line, as well as an arrow indicating directionality from the first point to the second point. However, this is just an example. Other examples of graphical indicia include a minus sign indicating the egress side of the line, an arrow indicating directionality towards to ingress side of the line, different colors or shadings indicating the ingress side and the egress side of the line, etc. These and other graphical indicia can be used to indicate polarity individually or in combination as desired.

Figure 4B:
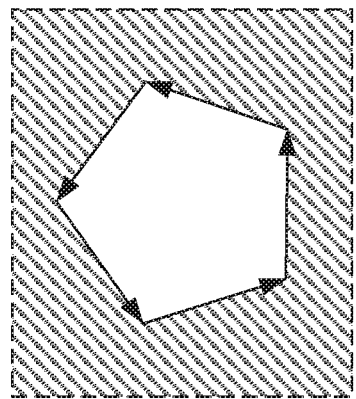
FIGS. 4A and 4B depict examples of images of polygons displayed with assigned polarity, created according the operation of a detection-area fence creating manager according to one implementation of the techniques described herein.
Figure 4A:
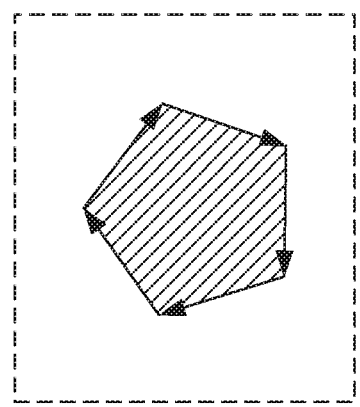

An example of the line defining module 207 defining a polygon comprising multiple connected lines is now described in more detail in conjunction with FIG. 4A. FIG. 4A illustrates the line defining module 207 defining a pentagon comprising five separate connected lines and having an inside and an outside. It is to be understood that this pentagon is just an example of a polygon, and polygons with other numbers of sides and different dimensions can be defined in other implementations. Polygons may be defined in response to user generated control signals, for example those indicating to draw multiple connected lines in a given order. Other examples of control signals that may be used to define polygons are signals indicating to place points at given locations on the image of the physical space, to draw lines based on the dragging of the curser to outline the polygon, the entering of vector coordinates, etc.

The polarity assigning module 209 may assign the polarity to the polygon relative to the order in which the multiple lines making up the polygon are defined, or based on other factors as desired. The assigned polarity of the polygon defines an ingress side of the polygon and an egress side of the polygon. For example, assigning the polarity of the polygon may take the form of defining the inside of the polygon as the ingress side and the outside of the polygon as the egress side (or vice versa).

The image outputting module 203 outputs an image of the polygon superimposed on the image of the physical space, such that the polarity of the polygon is graphically indicated. In the example shown in FIG. 4A, the inside of the polygon is defined as the ingress side and the outside of the polygon as the egress side. This is indicated by displaying a pattern in the ingress side of the polygon, which is the inside in this example. Other graphical indicia can be used to indicate the polarity of a polygon, such as one or multiple plus sign(s) indicating the ingress side of the polygon, one or multiple minus sign(s) indicating the egress side of the polygon, different colors, shading or patterns indicating the ingress side of the polygon and the egress side of the polygon, textual labels, etc.

An example of reversing the polarity of the polygon is now described in conjunction with FIG. 4B. As described above, the user may click on or otherwise interact with a GUI component or the like, indicating to reverse the polarity of a given line or polygon. This generates a control signal, and in response the polarity assigning module 209 reverses the polarity. In the example of FIG. 4B, the polarity of the polygon is reversed such that the outside of the polygon is now defined as the ingress side and the inside of the polygon as the egress side. The image outputting module 203 outputs an updated image of the polygon graphically indicating the reversed polarity. In the example shown in FIG. 4B, the inside of the polygon is now defined as the egress side and the outside of the polygon as the ingress side. This is indicated by displaying a pattern in the ingress side of the polygon (the outside). As noted above, other graphical indicia can be used to indicate the polarity of a polygon or line as desired.

It is to be understood that defined lines and polygons may correspond to actual physical boundaries in the physical space, such as walls (e.g., the walls of a room), or may simply be logical boundaries 303 defined in relation to a given physical space 301, such as logical boundaries virtually enclosing a given section of floor space in front of an HVAC unit, where none or only some of the defined lines correspond to actual physical ones. It is to be understood further that the scale used in the image of the physical space and the images of lines superimposed thereon is a variable design parameter, and different scales can be used in different scenarios and different implementations as desired. In some implementations, one or more depth values concerning lines and/or polygons may be defined, such distance from a sensor, distance from a surface (e.g., a wall), height above a surface (e.g., a floor, a table top), and depth below a surface (e.g., a ceiling). The definitions of lines and polygons may be stored, for example as vector data and corresponding metadata such as polarity information, depth information, etc. Different formats may be used for storing definitions of lines and polygons in various implementations as desired. Such definitions can be stored, for example, in a database 143, persistent storage 145, cloud storage 127, etc.

Returning to FIG. 2, the monitoring module 211 monitors physical objects in the physical space 301 in relation to defined line(s) and/or polygon(s). This monitoring can be implemented using various types of sensors 113 such as image sensors that can track or otherwise detect motion of people or other types of objects, for example a motion sensor, a proximity sensor, a depth sensor, a video camera, a positioning sensor using, e.g., GPS, cellular, near field communications, video location, and other positioning techniques, etc. Monitoring physical objects in relation to a polarized line can take the form of detecting physical objects crossing the line. For example, the monitoring module 211 can track people crossing a polarized line, which can be applied in the context of detecting people entering a conference room, office, building, or a specific section of one of these types of areas. In other implementations, specific types of physical objects are tracked instead of or in additional to people. For example, the monitoring module 211 may monitor tools being removed from or returned to shelves, or boxes being removed from or placed in a storage closet. Monitoring physical objects in relation to a polarized polygon can take the form of monitoring only the inside of the polygon (or only the outside of the polygon), and/or monitoring physical objects crossing into and/or out of the polygon.

The above-described monitoring in relation to polarized lines and/or polygons can be utilized to detect ingresses and egresses (e.g., of people and/or other types of physical objects). For example, the monitoring module 211 may monitor ingresses and egresses of people in relation to a polygon corresponding to, for example, a conference room or a specific section of floor space. This monitoring of ingresses and egresses may be used, for example, to maintain an occupancy count of a delineated area of the physical space 301 (e.g., as described by a polygon). For example, where ingress and egress of people is being tracked, an occupancy count of the number of people in the physical space corresponding to the polygon may be maintained. To do so, the monitoring module 211 starts with a known initial occupancy count (determined, for example, by detecting an initial number of people in the delineated space using image sensors). The monitoring module 211 may then increment the occupancy count whenever an ingress is detected, and decrement the occupancy count whenever an egress is detected. Where inanimate objects are being tracked, an initial inventory (e.g., of boxes, tools, etc.) may be incremented and decremented based on the detection of ingresses and egresses.

It is to be understood that one or more polarized lines may be used as directional gates, wherein traversing the polarized line in one direction is defined as an ingress and traversing the line in the other direction is defined as an egress. Such defined directional gates may correspond to a door or other form of physical portal in the physical space, or may correspond to a boundary segment that is logically defined as a directional gate without corresponding to a specific physical portal.

By monitoring physical space in relation to polarized lines and polygons as described above, the monitoring module 211 need not monitor the entire physical space 301, but instead only specific areas indicated by the polarized lines and polygons. In one example, instead of monitoring an entire room, only the door(s) (delineated by polarized lines, e.g., directional gates) would be monitored to maintain an occupancy count. In another example, only the area inside of a given polygon delineating a room or area of floor space that is of interest would be monitored. It is to be understood that these are just examples, and polarized lines and polygons corresponding to different objects and/or areas in the physical space may be defined as desired.

The action taking module 213 takes one or more actions in response to activity detected by the monitoring module (e.g., crossing of a polarized line, entry or exit from a given polygon, a maintained occupancy count, etc.). Various actions are possible in this context. For example, a corresponding directive may be automatically output to one or more specific parties (e.g., inform a fire marshal or building manager that it is not necessary to evacuate check a given room during an emergency because it is known to be empty). Other examples of actions include but are not limited to automatically adjusting a climate control system that controls temperature of the detection-area (e.g., in response to the occupancy count and current temperature both exceeding thresholds, or the detection-area being empty), automatically adjusting a lighting system that controls illumination of the detection-area (e.g., in response to the current occupancy count and illumination level), limiting ingress and/egresses from the detection-area, automatically activating or deactivating a security system, turning a given piece of equipment on or off, etc. These are just examples of actions that can be automatically taken. Other actions can be utilized in different implementations as desired.

Figure 5:
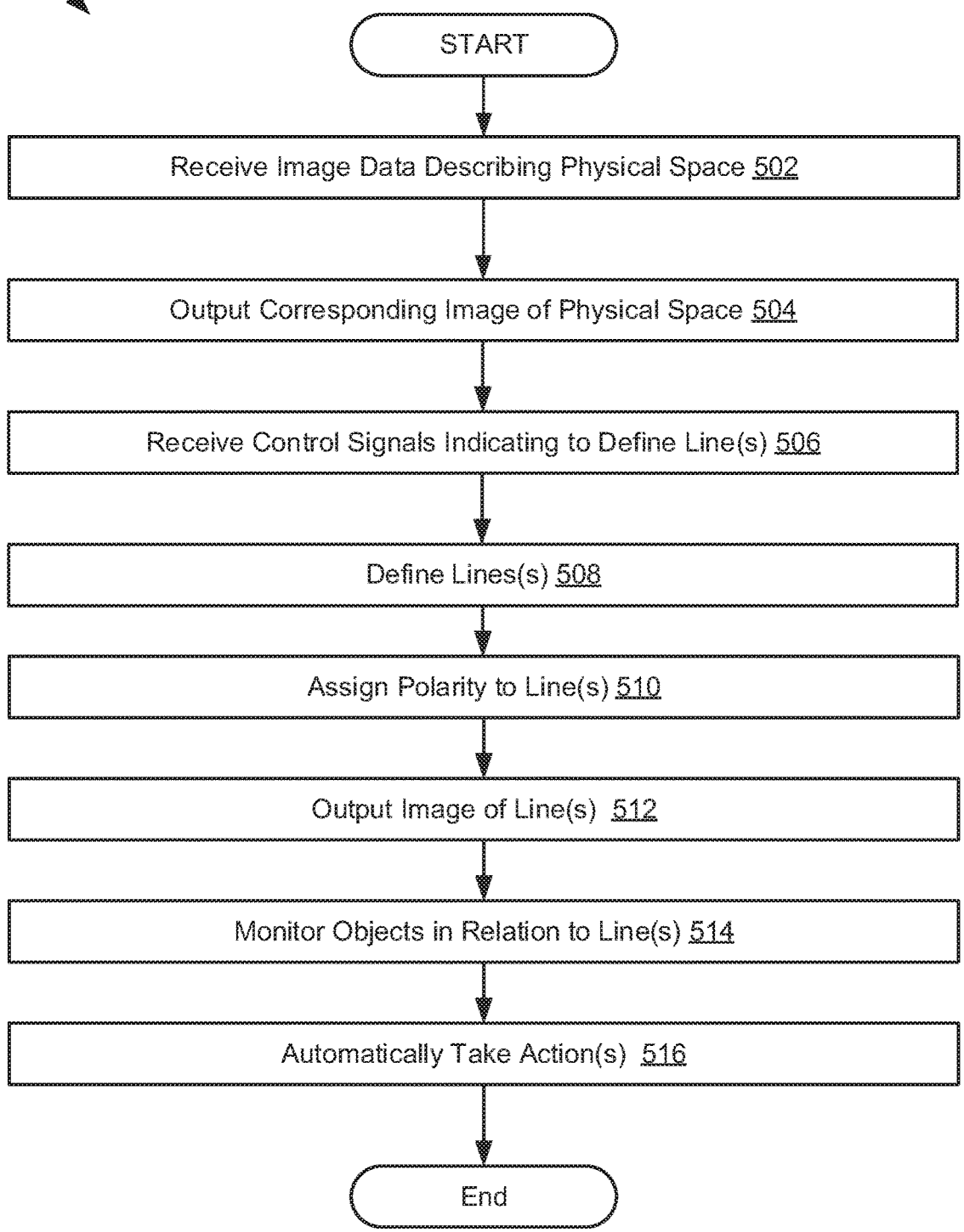
FIG. 5 depicts a flow diagram illustrating one implementation of a method for creating detection-area fences with polarity for object monitoring.

FIG. 5 depicts a flow diagram illustrating one implementation of a method 500 for creating detection-area fences with polarity for object monitoring. At 502, the image data receiving module 201 may receive image data describing a physical space 301 from at least one sensor 113. At 504, the image outputting module 201 may output a corresponding image of the physical space 301 to a user. At 506, the control signal receiving module 205 may receive user generated control signals indicating to define one or more line(s) at specific coordinates in relation to the physical space 301. At 508, the line defining module 207 may define one or more lines in response to the received user generated control signals (multiple lines may form a polygon). At 510, the polarity assigning module 209 may assign a polarity to the line(s), wherein crossing at least one line in a first direction is defined as an ingress and crossing at least one line in a second, opposite direction is defined as an egress. At 512, the image outputting module 201 may output an image of the one or more line(s) and/or polygon(s) superimposed on the image of the physical space 301, wherein the image of the line(s) graphically indicates the assigned polarity. At 514, the monitoring module 211 may monitor physical objects in relation to the one or more line(s) and/or polygon(s) in the physical space 301. At 516, the action taking module 213 may automatically takes one or more actions in response to activity detected by the monitoring.

A system and method for creating detection-area fences with polarity for object monitoring, including monitoring of object ingress and egress has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one implementation above primarily with reference to software and particular hardware. However, the present invention applies to any type of computing system that can receive data and commands, and present information as part of any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some implementations can take the form of an entirely hardware implementation, an entirely software implementation or an implementation containing both hardware and software elements. One implementation is implemented in software, which includes but is not limited to firmware, resident software, microcode, etc.

Furthermore, some implementations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various implementations as described herein.

The foregoing description of the implementations has been presented for the purposes of illustration and description. It is not intended to be exhaustive or to limit the specification to the precise form disclosed. Many modifications and variations are possible in light of the above teaching. It is intended that the scope of the implementations be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving image data describing a physical space from at least one sensor;
outputting a corresponding image of the physical space to a user;
receiving user generated control signals indicating multiple lines at specific coordinates in relation to the physical space;
defining a polygon in response to the received user generated control signals, the polygon having multiple connected lines, an inside and an outside;
assigning a polarity to the polygon relative to an order in which the multiple lines defining the polygon were received, the polarity of the polygon defining an ingress side of the polygon and an egress side of the polygon, wherein the inside of the polygon is defined as the ingress side and the outside of the polygon is defined as the egress side based on the order in which the multiple lines received to define the polygon being clockwise and the outside of the polygon is defined as the ingress side and the inside of the polygon is defined as the egress side based on the order in which the multiple lines received to define the polygon being counterclockwise;
outputting an image of the polygon superimposed on the image of the physical space, wherein the image of the polygon graphically indicates the assigned polarity;
monitoring physical objects in relation to the polygon in the physical space; and
automatically taking at least one action in response to activity detected by the monitoring.

2. The method of claim 1, wherein receiving user generated control signals includes receiving signals indicating an additional line at specific coordinates in relation to the physical space and further comprising:
defining the additional line in response to the received user generated control signals;
assigning a polarity to the additional line wherein crossing the additional line in a first direction is defined as an ingress and crossing the additional line in a second, opposite direction is defined as an egress; and
reversing the polarity of the additional line.

3. The method of claim 2, further comprising:
displaying a graphical object, user activation of which reverses the polarity of the additional line;
receiving a control signal in response to the user interacting with the displayed graphical object; and
reversing the polarity of the additional line in response to the received control signal.

4. The method of claim 2, further comprising saving vector data describing the additional line.

5. The method of claim 2, wherein defining the additional line in response to the received user generated control signals further comprises:
defining at least one depth value concerning the additional line, from a group of depth values consisting of: distance from at least one sensor, distance from a surface, height above a surface, and depth below a surface.

6. The method of claim 1, further comprising:
defining a single line between a first point and a second point, the first point and the second point being defined responsive to the user generated control signals; and
assigning the polarity to the single line relative to an order in which the first point and the second point are defined, wherein the polarity of the line defines an ingress side of the line and an egress side of the line.

7. The method of claim 6, further comprising:
outputting an image of the single line superimposed on the image of the physical space, wherein the polarity of the single line is graphically indicated by displaying at least one from a group consisting of:
a plus sign indicating the ingress side of the line, a minus sign indicating the egress side of the line, an arrow indicating directionality towards to the ingress side of the line, an arrow indicating directionality from the first point to the second point, and different colors indicating the ingress side and the egress side of the line.

8. The method of claim 6, further comprising:
monitoring physical objects in relation to the single line, further comprising monitoring physical objects crossing the single line.

9. The method of claim 1, wherein assigning the polarity of the polygon further comprises a step from a group of steps consisting of:
defining the inside of the polygon as the ingress side and the outside of the polygon as the egress side; and
defining the outside of the polygon as the ingress side and the inside of the polygon as the egress side.

10. The method of claim 1, wherein the polarity of the polygon is graphically indicated by displaying at least one from a group consisting of:
at least one plus sign indicating the ingress side of the polygon, at least one minus sign indicating the egress side of the polygon, different graphical indicia indicating the ingress side of the polygon and the egress side of the polygon, and different colors indicating the ingress side of the polygon and the egress side of the polygon.

11. The method of claim 1, wherein monitoring physical objects in relation to the polygon further comprises monitoring only the inside of the polygon.

12. The method of claim 1, wherein monitoring physical objects in relation to the polygon further comprises monitoring only the outside of the polygon.

13. The method of claim 1, wherein monitoring physical objects in relation to the polygon further comprises monitoring objects crossing into and/or out of the polygon.

14. The method of claim 1, wherein receiving image data describing a physical space from at least one sensor further comprises:
receiving image data from at least one sensor from a group of sensors consisting of: an image sensor, an ambient light sensor, an infrared sensor, a depth sensor, a thermal camera, a motion sensor, a proximity sensor, a video camera and a positioning sensor.

15. The method of claim 1, wherein monitoring physical objects in relation to the polygon in the physical space further comprises:
monitoring the polygon in the physical space using at least one sensor from a group of sensors consisting of: an image sensor, an ambient light sensor, an infrared sensor, a depth sensor, a thermal camera, a motion sensor, a proximity sensor, a video camera and a positioning sensor.

16. The method of claim 1, wherein monitoring physical objects in relation to the polygon in the physical space further comprises:
detecting ingresses and egresses.

17. The method of claim 16, wherein detecting ingresses and egresses further comprises at least one step from a group of steps consisting of:
  detecting ingresses and egresses of people; and
  detecting ingresses and egresses of a specific type of object.

18. The method of claim 1, further wherein:
  the physical space further consists of one from a group consisting of: a building, a room, a portion of a building, a portion of a room, an office, a specific area of floor space, an area containing or proximate to specific machinery or equipment and a storage area.

19. The method of claim 1, wherein automatically taking at least one action in response to activity detected by the monitoring further comprises at least one step from a group of steps consisting of:
  automatically outputting an electronic directive to a specific party;
  automatically adjusting a climate control system that controls temperature of the physical space;
  automatically adjusting a lighting system that controls illumination of the physical space,
  automatically activating or deactivating a security system;
  automatically turning a given piece of equipment on or off;
  limiting ingress to the physical space; and
  limiting egress from the physical space.

20. A system comprising:
  at least one processor; and
  a memory, the memory storing instructions which when executed cause the at least one processor to:
    receive image data describing a physical space from at least one sensor;
    output a corresponding image of the physical space to a user;
    receive user generated control signals indicating multiple lines at specific coordinates in relation to the physical space;
    define a polygon in response to the received user generated control signals, the polygon having multiple connected lines, an inside and an outside;
  assign a polarity to the polygon relative to an order in which the multiple lines defining the polygon were received, the polarity of the polygon defining an ingress side of the polygon and an egress side of the polygon, wherein the inside of the polygon is defined as the ingress side and the outside of the polygon is defined as the egress side based on the order in which the multiple lines received to define the polygon being clockwise and the outside of the polygon is defined as the ingress side and the inside of the polygon is defined as the egress side based on the order in which the multiple lines received to define the polygon being counter-clockwise;
  output an image of the polygon superimposed on the image of the physical space, wherein the image of the polygon graphically indicates the assigned polarity;
  monitor physical objects in relation to the polygon in the physical space; and
  take automatically at least one action in response to activity detected by the monitoring.

* * * * *